Figure 1:
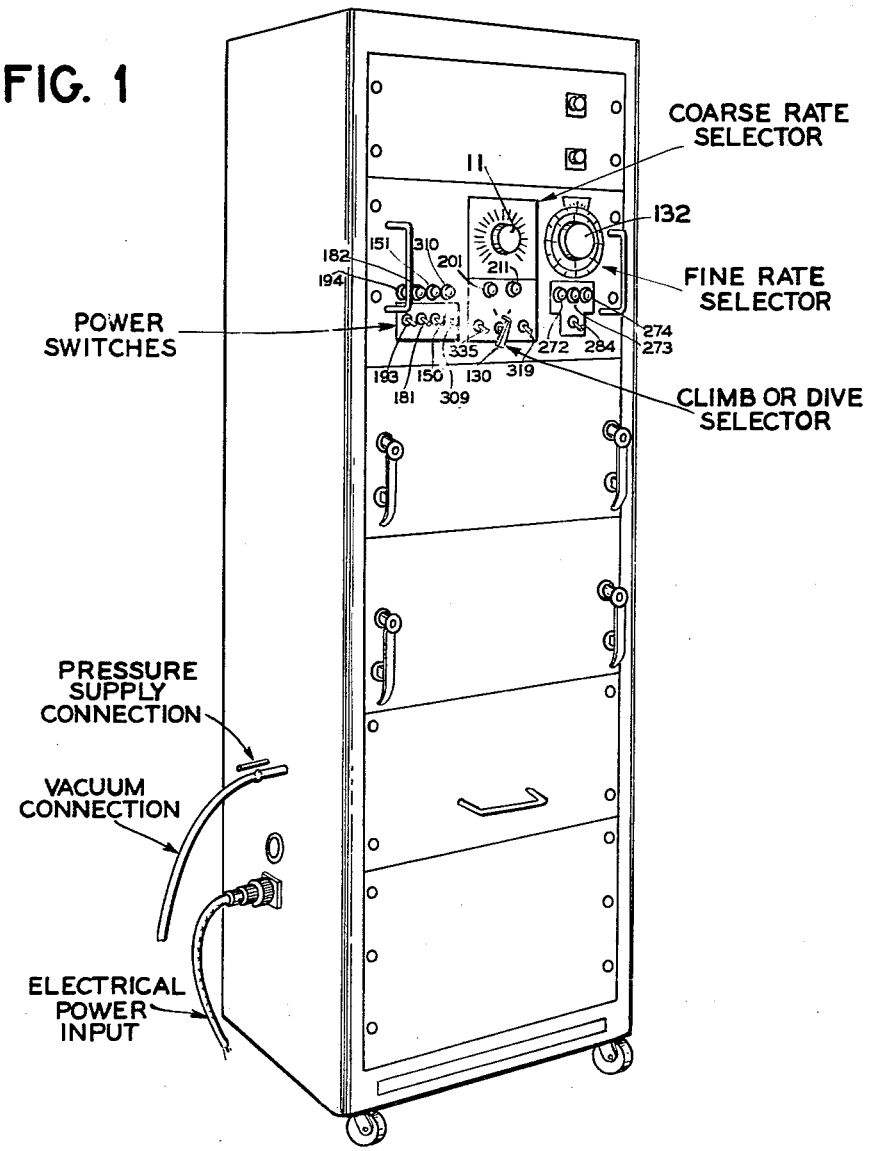

INVENTOR.
SAUL L. MALKIEL
BY Herbert L. Davis
ATTORNEY

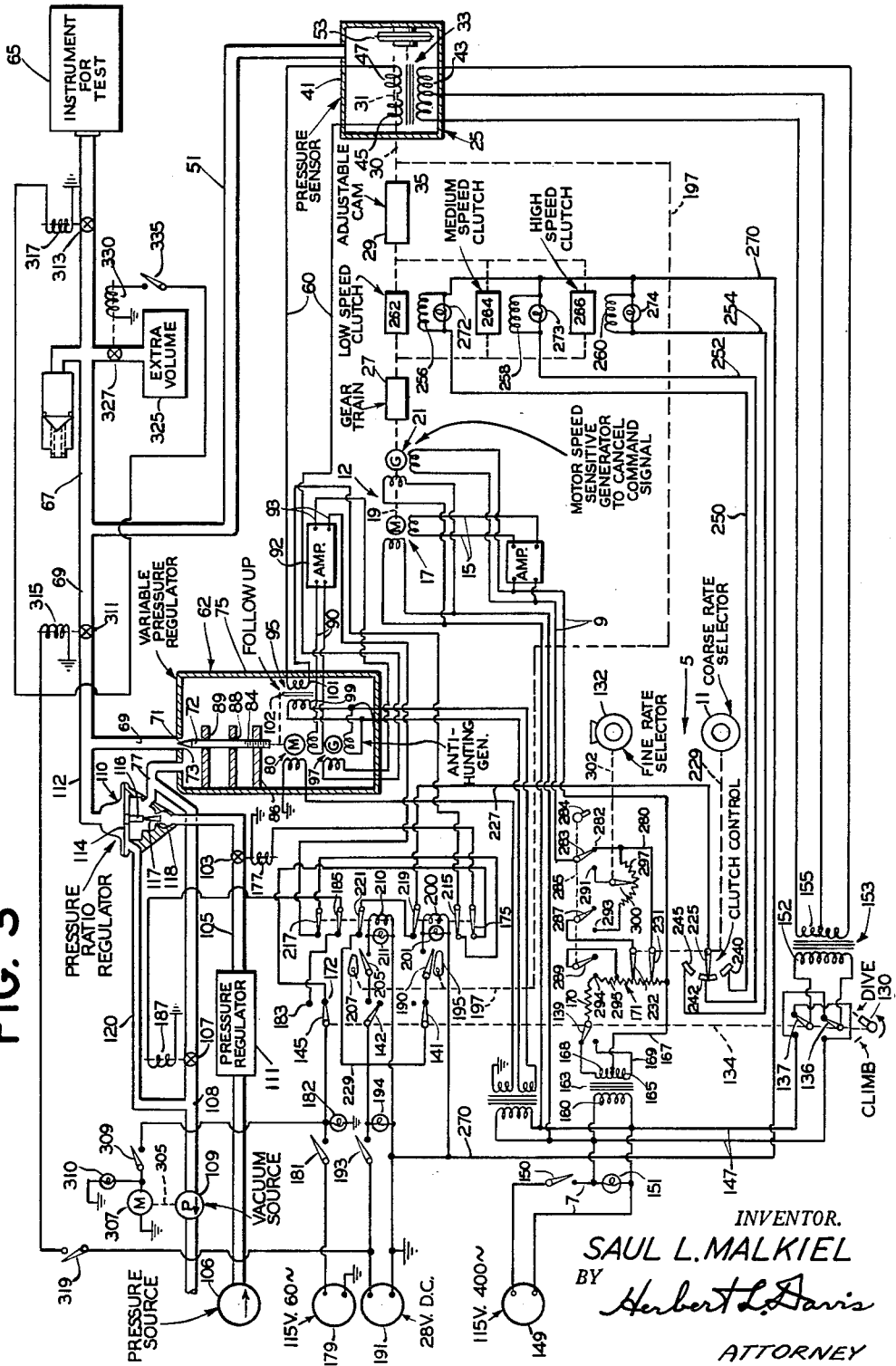

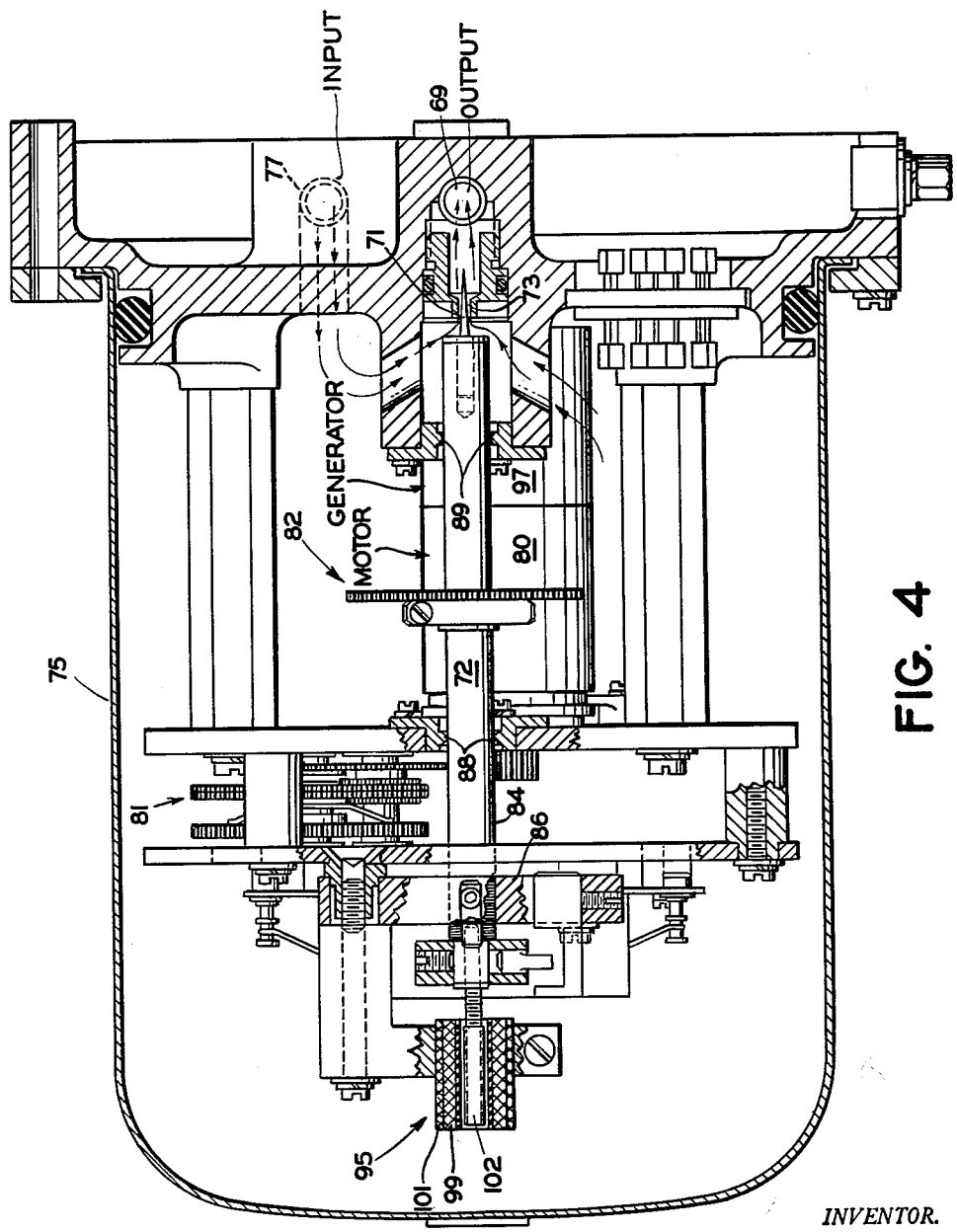

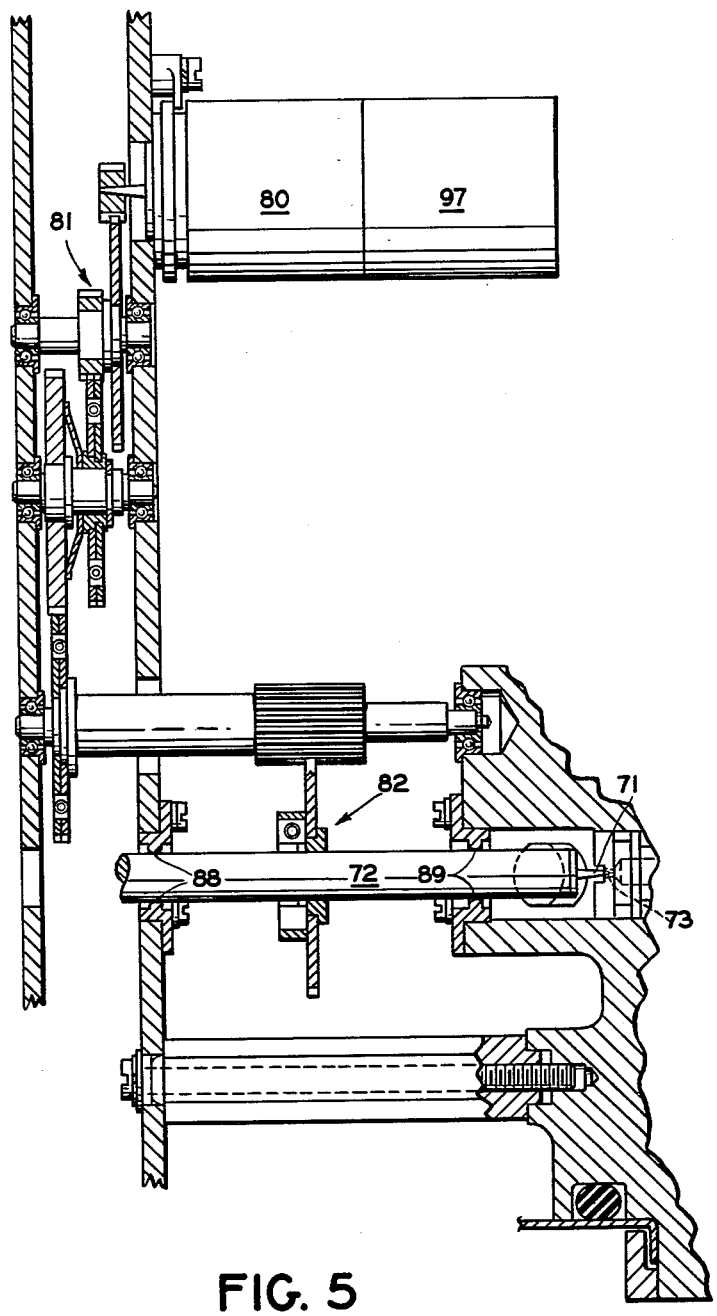

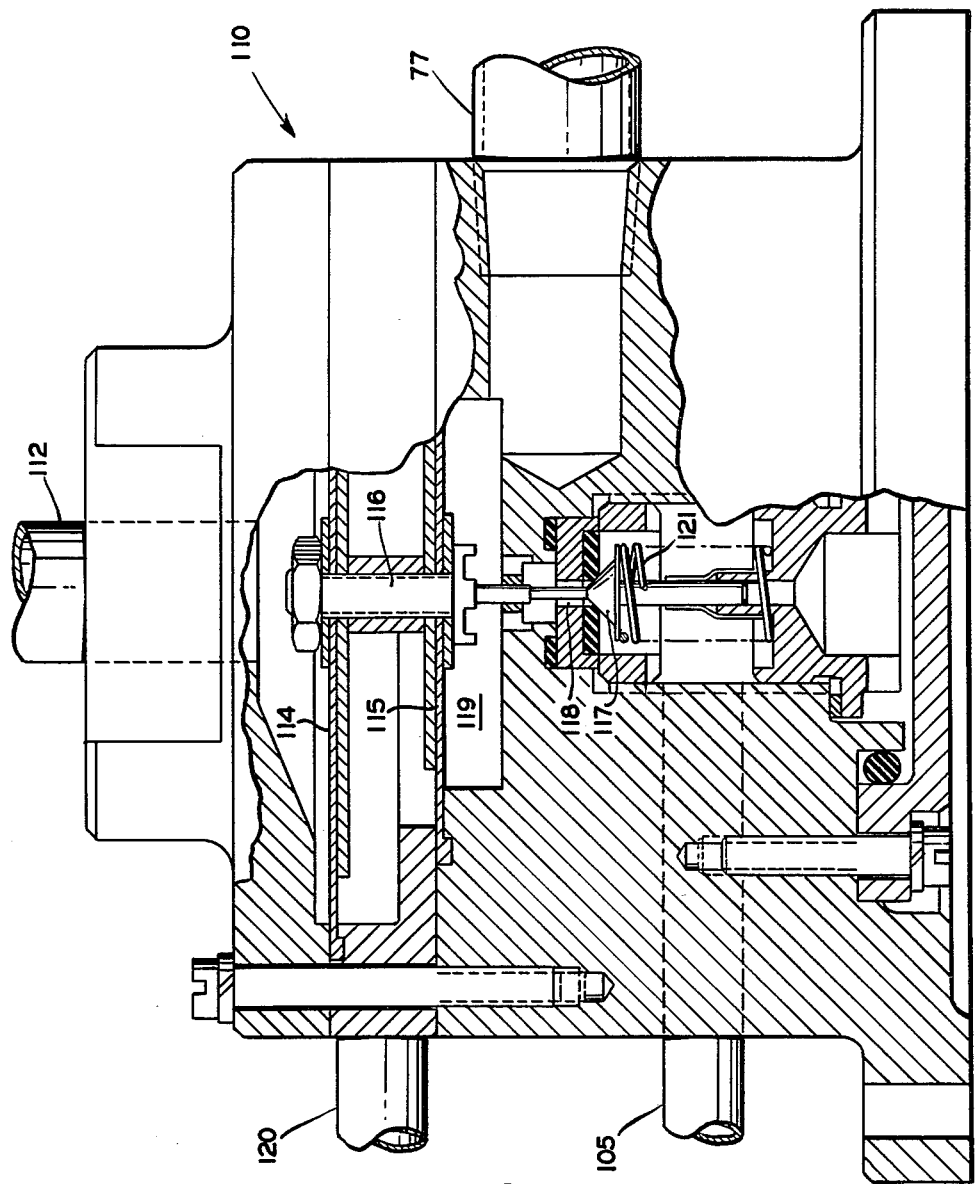

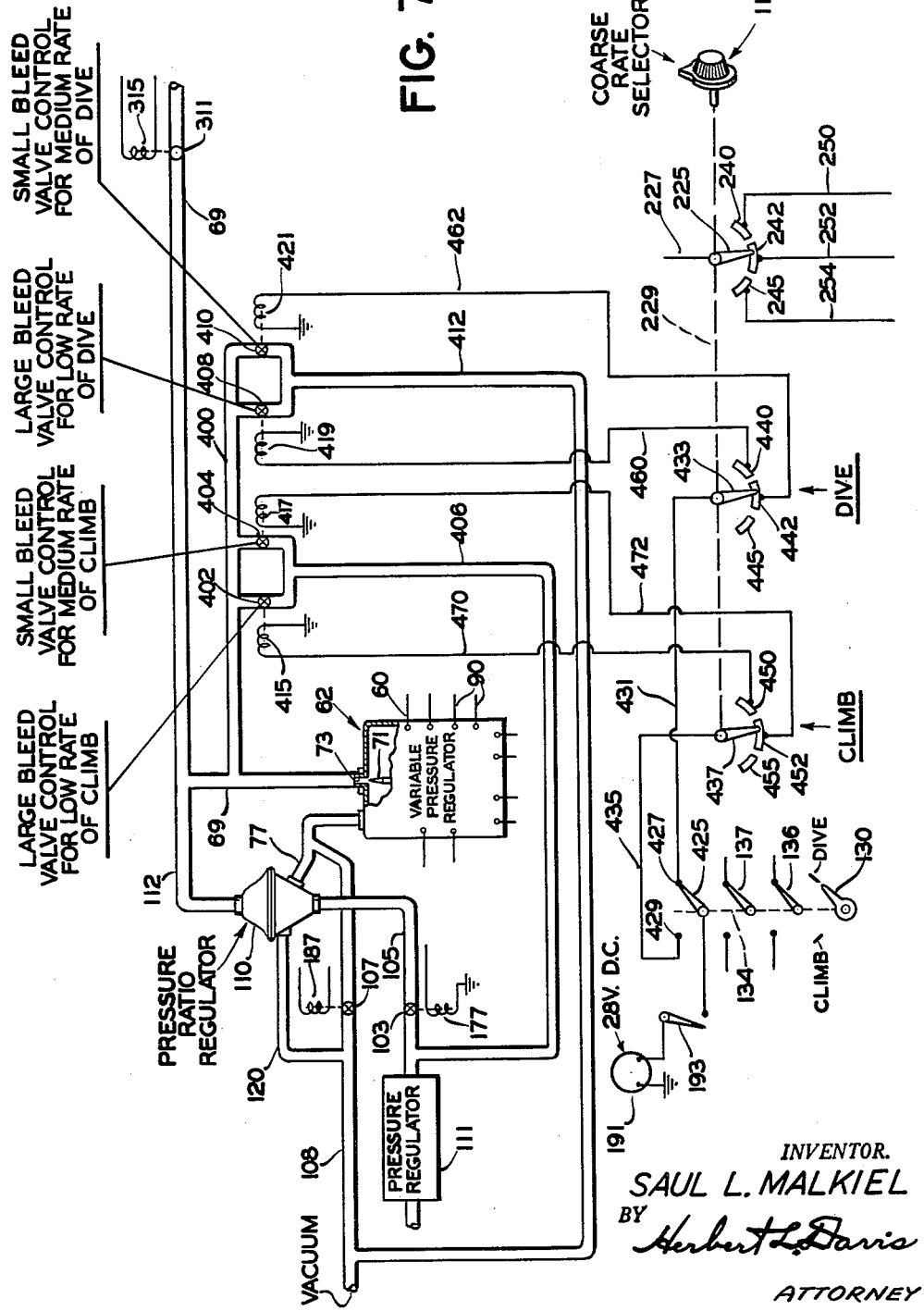

3,060,718
TEST APPARATUS FOR A RATE OF CLIMB AND DIVE GENERATING INSTRUMENT
Saul L. Malkiel, Maywood, N.J., assignor to The Bendix Corporation, a corporation of Delaware
Filed Dec. 10, 1959, Ser. No. 858,798
15 Claims. (Cl. 73—4)

The invention relates to improvements in a test apparatus and more particularly to a test apparatus for a rate of climb and dive generating instrument in which there is provided novel means for generating a constantly changing fluid pressure, the rate of increase or rate of decrease of this pressure being so adjusted as to produce fluid pressures simulating changes in altitude pressure related to U.S. standard atmosphere at different altitudes.

An object of the invention is to provide in such a test apparatus a novel selector mechanism whereby the simulated rate of change in altitude may be selected within the range of from 100 to 60,000 feet per minute and within a simulated altitude range of from sea level to 80,000 feet and in which test apparatus there may be provided novel means for applying the changing fluid pressure to a rate of climb and dive sensing instrument under test.

Another object of the invention is to provide a novel test apparatus for generating a fluid pressure having a selected rate of change or a rate of change of pressure that may be programmed so as to vary with pressure, time or a third variable.

Another object of the invention is to provide a novel test apparatus for a rate of climb or dive generating instrument in which there is provided a novel coarse and fine rate of pressure change selector together with a novel climb or dive selector which are so arranged as to be manually operable by the operator of the test apparatus so as to effect the desired rate of fluid pressure change necessary for effectively testing the instrument.

Another object of the invention is to provide a means by which very small rates of climb or dive are produced by means of fixed orifices which are placed in parallel with the regulator valve so as to allow the regulator to work close to its optimum point of travel.

Another object of the invention is to provide a novel test apparatus for simulating fluid pressures encountered in climbing and diving maneuvers of an aircraft and including a novel arrangement of a single variable pressure regulator valve in cooperative relation with a pressure ratio regulator valve and in which there is provided means for positioning the single regulator valve so as to effect changing fluid pressures for simulating selected climbing or diving maneuvers at varying selected rates.

These and other objects and features of the invention are pointed out in the following description in terms of the embodiment thereof which is shown in the accompanying drawings in which corresponding parts are indicated by corresponding numerals. It is to be understood, however, that the drawings are for the purpose of illustration only and are not a definition of the limits of the invention, reference being had to the apended claims for this purpose.

Figure 2:
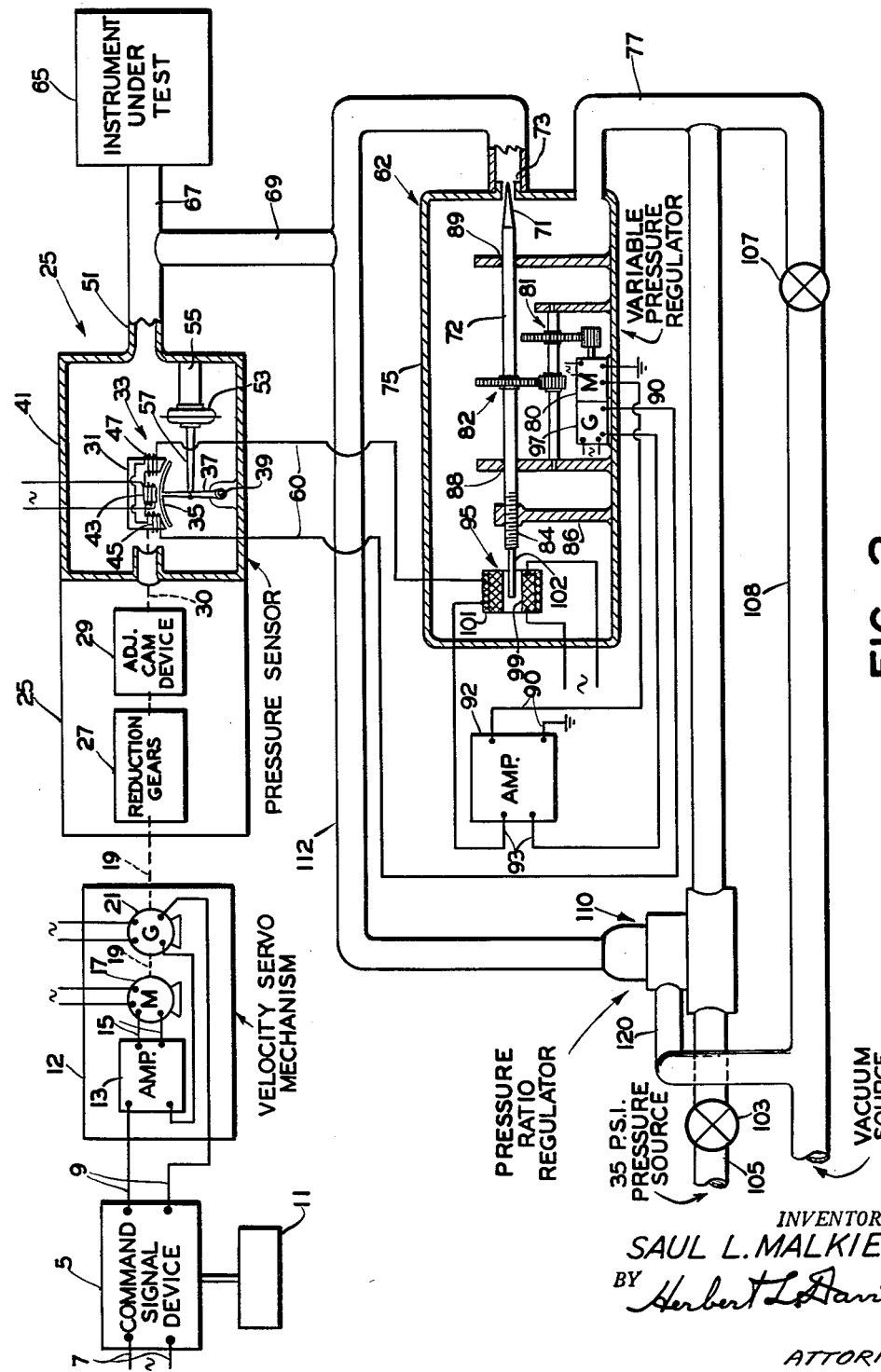

Referring to the drawings:
FIGURE 1 is a perspective view of a typical cabinet embodying the test apparatus.
FIGURE 2 is a schematic drawing of the test apparatus including a servo pressure sensor and regulating valve operatively controlled thereby so as to apply a variable fluid pressure to the instrument under test.
FIGURE 3 is a detailed wiring diagram of the test apparatus and control system therefor.
FIGURE 4 is a detail sectional view of the variable pressure regulator of the test apparatus.
FIGURE 5 is a fragmentary view of the operative gearing within the pressure regulator for adjustably positioning a pressure regulating needle valve in response to operation of a control motor.
FIGURE 6 is a detail sectional view of the pressure ratio regulator of the test apparatus.
FIGURE 7 is a schematic drawing of a modified form of the invention, including operator controlled fixed orifices connected in parallel with the pressure regulator to effect more accurate control thereof.

Referring to the drawing of FIGURE 2, there is shown diagrammatically a system for producting a regulated fluid pressure of a value such as to simulate atmospheric pressure conditions encountered at a constant or selected varying rate of climb or dive of an aircraft and applying such a regulated fluid pressure in the testing of a rate of climb or dive sensing instrument.

Indicated generally by the numeral 5 is a device having input lines 7 leading from a suitable source of alternating electric current and arranged so as to apply an output signal voltage across lines 9 which may be selected by the operator of the test apparatus by manually adjusting a suitable control 11. The command voltage signal device 5 may be of a conventional type for applying a selected signal voltage across the lines 9 or the same may be of a type shown in greater detail in FIGURE 3.

Further, as shown in FIGURES 2 and 3, the lines 9 lead to an input velocity servo mechanism indicated generally by the numeral 12 and including an amplifier 13 of conventional type having output lines 15 for supplying a signal voltage to a control winding of a reversible electric motor 17. The signal voltage serves to control the direction and rate of rotation of the electric motor 17 in driving an output shaft 19 and generator 21 operatively connected to the shaft 19. The generator 21 supplies an A.C. signal voltage to the input lines 9 in opposition to the command signal voltage applied by the device 5 and tending to cancel the command signal voltage.

Thus, the servo amplifier 13 in response to the command signal voltage applied across the lines 9 causes the motor-generator 17—21 to rotate at a speed such that the opposing generator output signal voltage is nearly equal to that of the command signal voltage applied by the device 5. The loop gain is so arranged as to provide a low ratio of error speed to actual speed, of for example .05%.

The rotation of shaft 19 varies the setting of a pressure sensor mechanism indicated generally by the numeral 25. The shaft 19 drives through a reduction gearing 27 an adjustable cam device 29 having output shaft 30 operatively connected so as to vary the adjusted position of one element 31 of an E pick-off transformer indicated generally by the numeral 33 and including, as shown in FIGURE 2, a second adjustable element or soft iron vane 35 carried by a rocking arm 37 pivoted at 39 within a sealed pressure chamber 41, as shown in FIGURE 2.

The element 31 of the E pick-off transformer 33, includes an exciting winding 43 on a central leg portion thereof and windings 45 and 47 on opposite legs thereof inductively coupled to the exciting winding 43 through the adjustable soft iron vane 35. The inductive coupling relationship thereof may be varied in a conventional manner by adjustment of the relationship between the adjustable element 31 and the adjustable iron vane 35.

Opening into the pressure chamber 41 is a fluid pressure conduit 51 and mounted within the pressure chamber 41 is an aneroid 53 affixed at one end 55 to the inner surface of the chamber 41 and having a link 57 at the opposite end operatively connected to the rocking arm 37 so as to adjustably vary the position of the soft iron vane 35 with changes in the fluid pressure within the chamber 41, as sensed by the aneroid 53.

The aneroid 53 serves to adjustably position the soft iron vane 35 through the link 57 and rocking arm 37 so as to give a general motion approximately linear with the pressure altitude in the chamber 41. Since the aneroid 53 is so arranged as to give a motion which is approximately linear with the altitude pressure, the E pick-off windings 45 and 47 inductively coupled to the exciting winding 43 produce a phase sensitive voltage across output lines 60 proportional to the angle between the element 31 of the E pick-off transformer 33 and the vane 35.

The sensor 25 is calibrated by a suitable arrangement of the cam device 29 so that linear increments of chamber pressure-altitude correspond to linear increments of rotation of the motor generator 17—21, the E pick-off output voltage being at zero. The adjustment of the element 31 of the E transformer 33 by the motor 17 is in effect followed by the adjustment of the vane 35 by the changes in the regulated fluid pressure acting on the aneroid 53 so as to tend to zero the output voltage across the lines 60 of the E pick-off 33. Thus the cam device 29 is so arranged that the movement imparted thereto through the reduction gearing 27 causes an adjustment of the element 31 by the output shaft 30 of the cam device 29 to effect a linear relationship between the regulated pressure altitude in the chamber 41 and the selected rate of rotation by the motor 17 of the generator 21.

Referring to the drawings of FIGURES 2 and 3, it will be seen then that a given command voltage applied by the device 5 across the lines 9 causes the motor 17 to drive the element 31 of the E transformer 33 at a speed which represents a certain rate of climb or dive. A variable pressure regulator 62 controlled by the voltage output from the transformer 33, as hereinafter explained, is then effective to apply an increasing or decreasing regulated fluid pressure corresponding to that encountered under such climbing or diving conditions to the sensor 25.

Thereupon the fluid pressure applied through the variable pressure regulator 62 to the pressure sensor 25 causes the aneroid 53 to adjust the vane 35 in response to such changing fluid pressure and effect an error voltage at the E pick-off 33 upon a difference between the adjustment of the elements 31 and 35 tending to cause the flow through the pressure regulator 62 to be automatically varied in a sense to cause the error voltage from the E pick-off transformer 33 applied across the output lines 60 to be reduced to zero.

The rate of fluid pressure change in the chamber 41 equals the rate of change in the pressure programmed by the speed of adjustment of the element 31 of the E transformer 33 and such changing fluid pressure is applied through a conduit 67, to the casing of the instrument under test to a chamber within which the instrument may be placed for test and indicated in FIGURES 2 and 3 by the numeral 65. The pressure conduit 67 is connected pneumatically in parallel with the conduit 51 of the sensor 41 to a conduit 69 leading from the variable pressure regulator 62 so that the fluid pressure applied to the sensor 41 is that of the fluid pressure applied to the instrument under test at 65.

The variable pressure regulator 62 includes a needle valve 71 projecting from a valve stem 72 and so arranged as to meter fluid flow through an orifice 73 in a sealed casing 75 of the regulator 62. The conduit 69 is connected through the orifice 73 as metered by the needle valve 71 to a fluid pressure medium within the casing 75. Leading into the casing 75 is a conduit 77 for supplying a positive or negative fluid pressure thereto, as may be selected by the operator of the test apparatus, as hereinafter explained.

Rotary motion is transmitted to the valve stem 72 and needle valve 71 by a motor 80 drivingly connected thereto and arranged to move the stem 72 along the longitudinal axis thereof by means of screw threads 84 provided on the valve stem 72 and cooperating with suitable screw threads in a member 86 fixedly supported in the casing 75, as shown schematically in FIGURES 2 and 3 and in greater detail in FIGURE 4.

The needle valve 71 is further rotatably supported within the casing 75 in bearings 88 and 89 carried by suitable supporting members fixedly mounted in the casing 75. The arrangement is such that upon the rotation of the valve stem 72 the same is constrained by the screw threads 84 in cooperation with the screw threads in member 86 to slide back and forth in the bearings 88 and 89 so that the needle valve 71 serves to meter the flow of a fluid pressure medium through the orifice 73.

The rate and direction of rotation of the valve 71 is affected by the motor 80 operatively controlled by the output signal applied through conductors 90 leading from a servo amplifier 92 which in turn has signal input lines 93 connected to the output lines 60 leading from the E pick-off transformer 33 through stabilizing mechanism hereinafter described.

There are two stabilizing voltages applied to the input lines 93 in opposition to the controlling error voltage applied across the output lines 60 and fed as input signals through the input lines 93 to the amplifier 92: to wit an A.C. signal follow-up voltage proportional to the adjusted position of the needle valve 71 and applied to the input lines 93 by a linear variable differential transformer 95, as well as an A.C. signal voltage from an anti-hunting generator 97 of conventional type and driven by the motor 80 so as to apply to the input lines 93 an anti-hunting signal voltage which is linear with the speed of adjustment of the needle valve 71.

The linear variable differential transformer 95 includes a primary or exciting winding 99 connected across the source of alternating current and inductively coupled to a secondary winding 101. Further controlling the inductive coupling relation between the windings 99 and 101 is a soft iron core member 102 operatively connected at an end of the valve stem 72 opposite to the needle valve 71 and longitudinally adjustable within the windings 99 and 101 with longitudinal adjustment of the needle valve 71 so as to vary the coupling relation between the windings 99 and 101 and thereby the magnitude of the follow-up signal applied by the transformer 95.

In generating a decreasing fluid pressure to simulate the conditions encountered during climb of an aircraft, a solenoid operated valve 103 is closed so as to effectively close a conduit 105 leading from a source of fluid pressure such as a fluid pressure tank 106 to the main conduit 77 while a second solenoid operated valve 107 is opened so as to effectively connect a second conduit 108 leading from a suitable source of vacuum or negative pressure such as a vacuum pump 109 to the main conduit 77.

When generating an increasing fluid pressure to simulate the conditions encountered in the dive of an aircraft, the phase of the input command voltage applied to the device 5 is reversed as well as the phase of the exciting winding 43 of the pressure sensor 25, as hereinafter explained, with reference to the schematic drawing of FIGURE 3, while the solenoid operated valve 107 is closed and the solenoid operated valve 103 is opened so as to effectively connect the source of positive fluid pressure 106 through a pressure regulator 111 and a pressure-ratio regulator 110 to the main conduit 77.

The pressure-ratio regulator 110, shown schematically in FIGURE 3 and in detail in FIGURE 6, provides an output fluid pressure in the line 77 approximately twice that of a reference fluid pressure applied from conduit 69 through the conduit 112 to the upper side of a resilient diaphragm 114 in the pressure-ratio regulator 110. As shown in FIGURE 6, a second resilient diaphragm 115 is mounted in the pressure-ratio regulator 110 in spaced relation to the resilient diaphragm 114 and operatively connected to a valve stem 116 together with the diaphragm 114 so as to control jointly therewith the position of an inverted pressure regulating valve member 117 at the lower end of the valve stem 116 in operative relation to an orifice 118. The under side of the diaphragm 114 and the upper side of the diaphragm 115 have a relative negative pressure applied thereto through a conduit 120 leading from the conduit 108 and the vacuum pump 109 or source of negative pressure, while the under side of the resilient diaphragm 115 is subject to the regulated pressure applied through the controlled orifice 118 to chamber 119 and through conduit 77 to the interior of the casing 75 of the variable pressure regulator 62.

The arrangement is such that as the pressure applied through the conduit 112 to the upper side of the diaphragm 114 increases the diaphragm 114 is biased downwardly in opposition to the biasing force of the regulated pressure applied to the under side of the diaphragm 115 and the force of a regulating spring 121 acting on the lower side of the valve member 117 so as to cause the inverted valve member 117 to increasingly open the orifice 118 and thereby increase the pressure applied through the orifice 118 into the chamber 119 and thereby from the pressure-ratio regulating valve 110 to the conduit 77 so as to provide an output pressure applied to the input of the variable pressure regulator 62 equal to approximately twice that of the reference pressure applied to the output conduit 69 from the regulator 62 so as to thereby keep the pressure-ratio across the variable pressure regulator 62 at a desirable 2 to 1 ratio.

Thus an input pressure to the variable pressure regulator 62 of twice its output pressure is applied so as to set up a flow proportional to the input pressure and independent of the output pressure for a given opening of the orifice 73 by the needle valve 71. The pressure-ratio thus maintained is greater than 1.6, which is the "choking" pressure-ratio for air. Such increased flow rate at high pressures is required, because of the nature of the pressure-altitude relationship, and allows the variable pressure regulator 62 to do a minimum of correcting under simulated diving conditions. Under simulated climbing conditions of the aircraft the change in flow rate with pressure is in a right sense to correct for the non-linearity of pressure altitude, so that the regulator 62 is in effect self regulated.

*Command Signal Device*

The command signal device 5 of FIGURE 2 is shown in greater detail in FIGURE 3, as including a climb or dive selector 130, coarse rate selector 11 and a fine rate selector 132 each of which, as shown in FIGURE 1, are manually operable by the operator of the test apparatus. The climb or dive selector 130 is connected through a shaft 134, indicated in FIGURE 3, by dotted lines and controlling switch elements 136, 137, 139, 141, 142 and 145.

The switch arms 136 and 137 cooperate with suitable contacts connected through conductors 147 to lines 7 leading from a source of alternating current 149 and connected thereto through an operator-operative switch 150 having a light 151 controlled thereby and effective to indicate the operative condition thereof. The lines 147 are connected through the switch elements 136 and 137 across a primary winding 152 of an induction transformer 153 having a secondary winding 155. Upon adjustment of the climb or dive selector 130 from the dive position shown to the climb position, the switch elements 136 and 137 open the switch contacts shown and close other switch contacts in the selected climb position so that the connections of the lines 147 across the primary winding 152 are effectively reversed whereupon the electrical energy induced into the secondary winding 155 is of an opposite phase in the climb position from that in the selected dive position.

Thus, upon the pressure sensed by the aneroid 53 failing to increase at the rate set by the adjustment of the cam 29, there will be induced in the windings 45 and 47 a signal voltage of a phase and magnitude controlling the rate of rotation of the motor 80 of the regulator 62 in a pressure increasing sense while upon the pressure sensed by the aneroid 53 failing to decrease at the rate set by the adjustment of the cam 29, there will be induced in the windings 45 and 47 a signal voltage of an opposite phase and of a magnitude controlling the rate of rotation of the motor 80 in a pressure decreasing sense.

Further, connected across the lines 7 is a primary winding 160 of an induction transformer 163 having a secondary winding 165 and a conductor 167 leading from a center-tap thereof and conductors 168 and 169 leading from opposite ends of the secondary winding 165 to suitable contacts selectively closed by the switch arm 139 which is in turn connected through a resistor element 170 to one end of a command voltage resistor 171. The opposite end of the resistor element 171 is connected to the conductor 167 and through one of the conductors 9 to the input of the amplifier 13. The command voltage control resistor 171 is arranged to be selectively varied through manual operation of the coarse rate selector 11 so as to vary the command voltage signal applied across the lines 9, as will be explained hereinafter in greater detail.

With the selector 130 in the dive position shown in FIGURE 3, the selector shaft 134 operative thereby adjusts the switch arm 145 to a position closing a contact 172 and thereby a circuit through a relay switch arm 175 for energizing a solenoid 177 to open the valve 103 which may be of a type normally biased by a spring, not shown, to a closed position. The source of electrical energy 179 may be connected to the switch arm 145 by the operator of the test apparatus first closing a manually operable switch 181 having a light 182 controlled thereby and effective to indicate the operative condition thereof.

Similarly, upon the selector 130 being adjusted to the climb position, the shaft 134 positions the switch arm 145 so as to open the contact 172 and the circuit to the solenoid 177 and close a contact 183 for closing a circuit through a relay arm 185 for energizing a second solenoid 187 to open the valve 107 which also may be of a type normally biased by a spring, not shown, to a closed position.

Further, with the selector 130 in the dive position, as shown in FIGURE 3, the switch arm 141 is actuated to a position closing a contact to connect a second arm 190 to the source of electrical energy 191 upon a manually operable switch 193 being first closed by the operator of the test apparatus. The switch 193 has an electric lamp 194 controlled thereby and effective to indicate the operative condition thereof.

The arm 190 is in turn subject to actuation by a cam 195 drivingly connected through a shaft 197 to the output shaft 30 of the adjustable cam 29 so that upon adjustment of the element 31 to the limit of its movement in a dive pressure controlling sense, the cam 195 is adjusted so as to actuate the switch arm 190 to a circuit closing position in which an electromagnetic relay winding 200 is energized so as to open the relay switch arm 175 and thereby effect the deenergization of the solenoid 177 and cause the valve 103 to be closed under the biasing force of the operating spring thereof. Connected across the relay winding 200 is an electric lamp 201 which is energized upon the winding 200 being energized so as to indicate the operator of the test apparatus that the minimum altitude test condition has been reached.

Similarly, upon actuation of the selector 130 to the climb position, the switch arm 141 is actuated to a circuit open position while the switch arm 142 is adjusted to a position closing a contact to connect a second arm 205 to the source of electrical energy 191 upon switch 193 being first closed by the operator of the test apparatus. The switch arm 205 is in turn actuated by a cam 207 operated by the shaft 197 so as to close a circuit for energizing the relay winding 210 upon element 31 of transformer 33 being adjusted to the limit of its movement in a climb pressure controlling sense, whereupon the switch 205 is actuated by the cam 207 so as to effect energization of an electromagnetic relay winding 210.

The relay 210 upon energization in turn actuates the relay switch 185 to an open circuit position so as to deenergize the solenoid 187 whereupon the valve 107 is returned to a closed position under the biasing force of the operating spring thereof. Connected across the relay winding 210 is an electric lamp 211 which is energized with the winding 210 to indicate to the operator of the test apparatus that the maximum altitude test condition has been reached.

The relay windings 200 and 210 also control respectively serially connected relay switch arms 215 and 217 and serially connected relay switch arms 219 and 221 so that upon energization of relay winding 200 relay switch arms 215 and 219 as well as switch arm 175 are actuated to positions opening the respective circuits controlled thereby while upon energization of the relay winding 210 the relay switch arms 217 and 221 as well as switch arm 185 are actuated to positions opening the respective circuits controlled thereby.

The foregoing operation, the actuation of either relay switch arm 215 or 217 to an open position is effective to disconnect the output lines 60 of the pressure sensor 25 from the input lines 93 of the amplifier 92. Similarly the actuation of either relay switch arm 219 or 221 to an open position is effective to disconnect the source of the electrical energy 191 from a clutch control arm 225 connected by an electrical conductor 227 to the relay switch arm 219 which in turn is serially connected through switch arm 221 to the source of electrical energy 191 through an electrical conductor 229 upon the operator-operative switch 193 being in a closed position.

The clutch control arm 225 is operatively connected to the coarse rate selector 11 through a shaft 229 arranged to operatively position switch arms 231 and 232 in controlling relation to the command voltage control resistor 171.

The clutch control arm 225 cooperates with switch contacts 240, 242 and 245 which are in turn connected through conductors 250, 252 and 254 respectively to solenoids 256, 258 and 260 to operatively control a low speed clutch 262, medium speed clutch 264 and high speed clutch 266 respectively.

The clutch mechanisms 262, 264 and 266 are selectively connected in driving relation between the gear train 27 and adjustable cam device 29 upon the selective energization of the solenoids 256, 258 and 260 respectively controlled by the operation of the clutch control arm 225 in opening and closing the respective contacts 240, 242 and 245.

Further, the arrangement is such that one end of each of the respective control solenoids 256, 258 and 260 is connected through conductors 250, 252 and 254 to the contacts 240, 242 and 245 and thereby selectively connected through switch arm 225, conductor 227, relay switches 219 and 221, conductor 229 and manually operable switch 193 to one side of the source of electrical energy 191, while the opposite side of the source of electrical energy 191 is connected through a conductor 270 to the opposite end of each of the respective clutch control solenoids 256, 258 and 260. Suitable electrical indicator lights 272, 273 and 274 are connected across the respective clutch control solenoids 256, 258 and 260 so as to provide convenient indicator means whereby the operator of the test apparatus may readily determine whether one or the other of the clutch mechanisms is in the operative relation.

The arrangement is such that the operator-operative climb or dive selector 130 in a climb or dive selecting position, the rate of change in the effective pressure applied to the instrument for test under such selected condition may be varied by the operation of the coarse rate selector 11 which is effective through the shaft 229 to close the contact 240 to render the low speed clutch 262 operative while simultaneously varying as the arm 225 moves over the contact 240 in a clockwise direction the adjustment of the arms 231 and 232 over the variable control resistor 71.

The arm 231 is connected through a conductor 280 to a contact 282 which in the coarse selector position shown, may be closed by a switch 283 so as to connect the arm 231 and effective portion of the resistor 171 across the command signal voltage lines 9. Thus the command signal voltage applied across the input lines 9 to the amplifier 13 may be increased and thereby the speed of the motor 17 as the arms 225, 231 and 232 are moved in a clockwise direction.

Further as the arm 231 is moved along the resistor 171 toward the resistor 170 the speed of the motor 17 and the movement of the adjustable cam 29 effected through the low speed clutch 262 will increase up to the maximum speed that may be applied through the low speed clutch 262.

Additional rotation of the clutch control arm 225 in a clockwise direction by operation of the coarse rate selector 11 will effect an opening of the contact 240 and a closing of the contact 242 to bring into operation the medium speed clutch 264, while simultaneously increasing the command signal voltage applied across the lines 9 to effectively increase the speed of the motor 17 in a pressure increasing or decreasing sense depending upon the phase of the voltage applied by the operation of the selector switch 139 and upon whether the operator-operative selector 130 is adjusted to a dive or climb position.

Additional rotation of the coarse rate selector 11 so as to move the clutch control arm 225 along the switch contact 242 in a clockwise direction will cause the clutch control arm 225 to open the contact 242 and close a third contact 245 to now effect operation of the high speed clutch 266 to further increase the speed of adjustment of the cam 29 by the motor 17 while simultaneously increasing the command signal voltage applied across the lines 9 to effectively increase the speed of the motor 17 in a pressure increasing or decreasing sense as determined by the position of the selector 130 in a dive or climb position. Thereafter further adjustment of the arm 232 toward the end of the resistor 171 upon clockwise rotation of the arm 225 will further increase the command signal voltage to the motor 17 to its maximum value. Rotation of the arms 225 and 231 in a counterclockwise direction will progressively decrease the command voltage signal and the speed of adjustment of the cam 29 through the selective opening and closing of the contacts 245, 242 and 240 in reverse order.

It will be seen then that the operator of the test apparatus through adjustment of the coarse rate selector 11 may vary the speed of adjustment of the cam 29 by controlling the command signal applied across the lines 9 and also by selectively controlling the clutch mechanism 262, 264 and 266 effective between the motor 17 and adjustable cam 29 in cooperation therewith.

Further to bring into operation the fine rate selector 132, a fine rate selector member 284 operatively connected through a shaft 285 to switch members 283, 287 and 289 may be manually adjusted by the operator in a clockwise direction from the position shown in FIGURE 3 to a second position at which the fine rate selector 132 is rendered effective by the actuation of the switch arm 283 so as to open contact 282 and close a contact 291 while the switch arm 287 and switch arm 289 are simultaneously actuated thereby to close a contact 293 and a contact 294 respectively.

The closing of contact 294 by switch arm 289 serves to shunt a portion 295 of the resistor 171 out of operation, while the closing of switch contact 293 by switch arm 287 serves to effectively connect one end of a variable resistor 297 to the arm 232 adjustably positioned relative to resistor 171 simultaneously with the arm 231.

The opposite end of the resistor 297 is connected to the electrical conductor 280 leading from the arm 231 to the now open contact 282. Cooperatively contacting the resistor 297 so as to vary the effective resistance thereof is an adjustable arm 300 connected to the contact 291 so that upon the switch arm 237 opening the contact 282 and closing the contact 291 the variable resistance 297 is effectively connected across the two simultaneously positioned arms 231 and 232.

The variable resistance arm 300 is arranged to be adjustably positioned through a shaft 302 by the fine rate selector 132. Thus with the switch 283 adjusted to the second position closing contact 291, the switch arms 287 and 289 close contacts 293 and 294 respectively and the fine rate selector 132 is brought into operation to effect a fine adjustment of the rate of pressure change selected by the operator through the operation of the coarse rate selector 11. The closing of contact 294 so as to shunt the portions 295 of the resistor 171 out of operation tends to compensate for the insertion of the variable resistor 297 into the circuit of the resistor 171 by the closing of contacts 291 and 293.

Further, as shown in FIGURE 3 the vacuum pump 109 is driven through a shaft 305 by a motor 307 which is arranged to be brought into operation by the closing of a manually operable switch 309. An electric lamp 310 controlled by the switch 309 is effective to indicate the operation thereof.

In addition valves 311 and 313 controlling pressure conduits 69 and 67 respectively are normally biased by suitable spring means not shown to conduit closing positions. There are further provided solenoids 315 and 317 which upon energization actuate the valves 311 and 313 respectively to open positions. Controlling such energization of the valve controlling solenoids 315 and 317 is a manually operable switch 319 which may be actuated by the operator of the test apparatus to a circuit closing position for energizing the respective solenoids 315 and 317 so as to effectively connect the pressure sensor 25 and instrument test chamber 65 to the output conduit 69 of the variable pressure regulator 62.

Should operation of an additional test chamber 325 be desirable, there is provided an additional control valve 327 normally biased by a suitable spring means not shown so as to close the chamber 325 to the pressure conduit 67, but which valve 327 may be actuated to an open position by energization of a valve controlling solenoid 330. Controlling the energization of the solenoid 330 is an operator-operative switch 335 which when use of the chamber 325 is desired may be actuated to a circuit closing position by the operator for energizing the valve controlling solenoid 330.

*Operation*

It will be seen from the foregoing that there is herein provided a novel apparatus and methd of generating a constantly changing fluid pressure in which the rate of increase or rate of decrease of this pressure is so adjusted as to provide a rate of decrease and rate of increase of such fluid pressure for simulating the changes in altitude pressure encountered during the climbing and diving maneuver of an aircraft. The arrangement is such that the rate of change in the simulated altitude pressure may be adjustable in the range of 100 to 60,000 feet per minute and within an altitude test range of from zero to 80,000 feet. Such change in pressure may be applied to the casing of a rate of climb sensing instrument 65 or to a chamber in which the instrument may be placed for such test purposes as shown schematically in the drawing of FIGURE 3.

Referring to FIGURES 2 and 3, the system includes a selectable command voltage device 5 which provides a signal input to a velocity servo mechanism 12. The velocity servo mechanism 12 includes an amplifier 13 responsive to the command signal voltage provided by the device 5 so as to cause the motor 17 and generator 21 driven thereby to rotate at a speed such that the output voltage from the generator 21 is nearly equal to that of the command voltage produced by the device 5. The loop gain is such as to provide a ratio or error speed to actual speed of 0.05%.

The output rotation of shaft 19 driven by motor 17 through the generator 21 drives a reduction gear train 27 and through the clutch mechanisms 262, 264 or 266 and adjustable cam device 29 an adjustable element 31 of an E pick-off transformer 33 mounted within the chamber 41 of the pressure sensor 25.

In the pressure sensor 25 there is provided an aneroid 53 arranged in conventional manner to drive a soft iron vane part 35 of the E pick-off transformer 33 through a system of links 57 and rocking arm 37 so as to give a motion to the vane 35 approximately linear with pressure altitude in the chamber 41, since the motion of the aneroid 53 is approximately linear with changes in the altitude pressure. The E pick-off transformer 33 produces a phase-sensitive voltage proportional to the angle between the adjustable element 31 and the adjustable vane 35.

Thus a given command voltage moves the element 31 of the E pick-off transformer 33 at a speed which represents a certain rate of climb or dive commanded by the device 5 and to be effected at the sensor 25.

The purpose of the variable pressure regulator 62 is to sense any error voltage produced by the E pick-off transformer 33 and to adjust the flow through the regulator 62 automatically so as to return the E pick-off output voltage to zero. With the voltage zeroed the pressure rate in the chamber 65 is equal to the rate programmed by the speed of the adjuster of the E transformer 31, and such pressure at the programmed rate is then applied to the unit under test in the chamber 65 which chamber is connected pneumatically in parallel with the sensor 25.

The chamber pressure regulator 62 as shown in the drawings of FIGURES 2, 3, 4 and 5 includes a needle valve 71 which meters the flow through orifice 73 in response to rotary motion transmitted from motor-generator 80 and 97, respectively, and transmitted through gearing 81 and 82 to the stem 72 of the needle valve 71 so as to be converted to longitudinal motion of the needle valve 71 along its long axis by means of the threads 84 cooperating with threads in the member 86, as best shown in FIGURE 4. Thus as the needle shaft 72 rotates within bearings 88 and 89, it is constrained to also slide back and forth so as to cause the needle valve 71 to meter the flow through the orifice 73.

The drive motor 80 is controlled by the error signal from the pressure sensor 25 and applied to the input of the amplifier 92. Further, there are two stabilizing voltages also applied to the input of the amplifier 92 including a voltage proportional to the valve position applied by the linear variable differential transformer 95 and an antihunting voltage from the motor driven generator 97 which is linear with the driven speed of the needle valve 71.

In generating decreasing pressure simulating climbing conditions encountered in an aircraft, the solenoid operated valve 103 is closed while the solenoid operated valve 107 is opened so as to apply the vacuum or negative source of pressure to the input line 77 of the variable pressure regulator 62. When generating increasing pressures simulating conditions encountered during the diving maneuvers of an aircraft, the phase of the input command voltage is reversed by the operation of the switch 139 as well as the phase of the voltage applied through switch elements 136 and 137 to the pressure sensor 25, while the solenoid operated valve 107 is closed and solenoid operated valve 103 is opened so as to apply the source of positive pressure through the pressure-ratio regulator 110 and therethrough to the input conduit 77 leading to the input orifice 73 of the variable pressure regulator 62.

The pressure-ratio regulator 110 is so arranged as to provide an output pressure to the input conduit 77 approximately twice that of the reference pressure applied through the output pressure conduit 69 from the pressure regulator 62 and through the conduit 112 to the pressure-ratio regulator 110 so as to cause the pressure-ratio across the variable pressure regulator 62 to be substantially maintained at a two to one ratio.

Thus an input pressure to the pressure regulator 62 of twice its output pressure is so applied as to set up a flow proportional to input pressure and independent of output pressure for a given opening of the valve 73 and a pressure-ratio which is greater than 1.6, which is the "choking" pressure-ratio for air.

This increased flow rate at high pressures is required because of the nature of the pressure altitude relationship, and allows the variable pressure regulator 62 to do a minimum of correcting during test conditions in simulating pressure conditions in a dive of an aircraft or in simulating pressure conditions encountered in an aircraft during a climb in which the flow rate with pressure decrease is in the right direction to correct for the non-linearity of pressure to altitude.

*Modified Form of the Invention of FIGURE 7*

In the drawing of FIGURE 7, there is indicated schematically a modified form of the invention and an arrangement to provide for a more accurate and closer regulation of the simulated pressures by the provision of fixed orifices of different sizes arranged in parallel relation to the variable pressure regulator 62 so as to cause the regulator to operate within a range close to its optimum operating point in effecting the regulated pressure. In the drawing of FIGURE 7 like numerals indicate corresponding parts to those heretofore described with reference to the preceding drawings of FIGURES 1 through 6.

In the modified form of the invention, in addition to the structure heretofore described with reference to the schematic drawing of FIGURE 3, there is provided, as shown in FIGURE 7, a conduit 400 opening from the regulated pressure conduit 69 and selectively connected to a conduit 406 through bleed valve 402 controlling a relatively large size bleed orifice or a bleed valve 404 controlling a relatively small size bleed orifice. The conduit 406 leads from the positive fluid pressure conduit 105. The conduit 400 may also be selectively connected to the conduit 406 through bleed valve 408 controlling a relatively large size bleed orifice or a bleed valve 410 controlling a relatively small size bleed orifice. The conduit 412 leads to the vacuum or negative fluid pressure conduit 108.

In further explanation of the selective operation of the bleed valves 402 and 404 in effecting the rate of flow of fluid pressure medium out of the conduit 69 through the regulator 62 at low or medium rates, when so commanded by the position of the selector 11, and under which selected low or medium rate of pressure decrease the regulator 62 would otherwise be operating out of its normal designed range, it may be noted that a differential action results in which the net flow of the fluid pressure medium in the conduit 69 is equal to the flow of the fluid pressure medium from the conduit 69 and through the pressure regulator 62 minus the flow of the fluid pressure medium through the bleed valve 402 or 404 and into the conduit 69. Such differential action results since the flow of the fluid medium through the regulating valve 62 is then outward with respect to the conduit 69 and that through the bleed valve 402 or 404 is inward with respect to the conduit 69.

Under such operating conditions there is a minimum controllable flow of pressure medium through the pressure regulator 62, and if a counter flow to conduit 69 through the bleed valves 402 or 404 from the pressure regulator 111 is established, then the servo system controlling the motor 80 in the pressure regulator 62 will reach a null or satisfied condition with the needle valve 71 of the regulator 62 in a normal operating position of high flow. The resultant flow of fluid pressure medium out of the conduit 69 will be the required relatively small flow condition commanded by the rate selector 11.

The above described operation is, of course, for a decreasing fluid pressure in the conduit 69 simulating prevailing conditions in a climbing maneuver of an aircraft and under which conditions the pressure ratio regulator 110 is rendered inoperative by the closing of valve 103 and the opening of valve 107, as heretofore explained with reference to FIGURE 3.

Conversely in the selective operation of the bleed valves 408 and 410 in effecting the rate of flow of fluid pressure medium into the conduit 69 through the regulator 62 at low or medium rates, when so commanded by the position of the selector 11, and under which selected low or medium rate of pressure increase the pressure regulator 62 would otherwise be operating out of its normal designed range, it may be noted that a differential action results in which the net flow of the fluid pressure medium in the conduit 69 is equal to the flow of the fluid pressure medium into the conduit 69 and through the pressure regulators 62 minus the flow of the fluid pressure medium through the bleed valve 408 or 410 from the conduit 69. Such differential action results since the flow of the fluid medium through the regulating valve 62 is then inward with respect to the conduit 69 and that through the bleed valve 408 or 410 is outward with respect to the conduit 69.

Under such operating conditions there is a minimum controllable flow of pressure medium through the pressure regulator 62, and if a counter flow from conduit 69 through bleed valve 408 or 410 to the vacuum conduit 412 is established, then the servo system controlling the motor 80 in the pressure regulator 62 will reach a null or satisfied condition with the needle valve 71 of the regulator 62 in a normal operating position of high flow. The resultant flow of fluid pressure medium into the conduit 69 will be the required relatively small flow condition commanded by the rate selector 11.

The above described operation is, of course, for an increasing fluid pressure in the conduit 69 simulating prevailing conditions in a diving maneuver of an aircraft and under which conditions the pressure ratio regulator 110 is rendered operative by the opening of valve 103 and the closing of valve 107 so that the pressure ratio regulator 110 is effective to provide an output fluid pressure in the line 77 varying with the pressure in the line 69 to maintain the pressure ratio across the variable pressure regulator 62 at the desirable 2 to 1 ratio, as heretofore explained with reference to FIGURES 3 and 6.

The bleed valves 402, 404, 408 and 410 are of a type normally biased to a close position by a spring means, not shown. The bleed valves 402 and 404 are selectively actuated to an open position upon selective energization of the respective control solenoids 415 and 417, while the bleed valves 408 and 410 are selectively actuated to an open position upon selective energization of the respective control solenoids 419 and 421.

The valve 404 upon selective energization of the solenoid 417 is actuated so as to provide a relatively small bleed opening permitting a slight flow of fluid pressure medium from the pressure regulator 111 through the conduit 406, bleed valve 404, and through the conduit 400 to the conduit 69 so as to cause the needle valve 71 of the regulator 62 to work at a moderate opening to the orifice 73 in regulating the negative pressure applied therethrough for accurately effecting a medium rate of change in the pressure applied at the conduit 69 to thereby simulate pressure changes encountered during a climb of an aircraft at rates within a predetermined medium range.

The valve 402 upon selective energization of the solenoid 415 is actuated so as to provide a relatively larger bleed opening permitting a greater flow of fluid pressure medium from the pressure regulator 111 through the conduit 406, bleed valve 402 and through the conduit 400 to the conduit 69 so as to cause the needle valve 71 of the regulator 62 to work at a moderate opening relative to the orifice 73 in regulating the negative pressure applied therethrough for accurately effecting a slower rate of change in the pressure applied at the conduit 69 to simulate pressure changes encountered during a climb of an aircraft at rates within a predetermined low range.

In effecting relatively high rates of pressure change to simulate rates of climb or dive of an aircraft within a predetermined high range the solenoids controlling the respective bleed valves are deenergized whereupon the bleed valves 402, 404, 408 and 410 are all biased to a closed position so that the positioning of the needle valve 71 may more sharply control the effective regulated pressure in the conduit 69.

Similarly the valve 410 upon energization of the solenoid 421 is actuated so as to provide a relatively small bleed opening permitting a slight flow of fluid pressure medium from the conduit 69 through the conduit 400 bleed valve 410 and through the conduit 412 to the vacuum or negative fluid pressure applied through the conduit 108 so as to cause the needle valve 71 of the regulator 62 to work at a moderate opening relative to the orifice 73 and accurately effect a medium rate of change in the pressure applied at the conduit 67 to thereby simulate pressure changes encountered during the dive of an aircraft at rates within a predetermined medium range.

Further, the valve 408 upon selective energization of the solenoid 419 is actuated so as to provide a relatively larger bleed opening permitting a greater flow of fluid pressure medium from the conduit 69 through the conduit 400 bleed valve 408 and through the conduit 412 to the vacuum or negative fluid pressure applied in the conduit 108 so as to cause the needle valve 71 of the regulator 62 to work at a moderate opening relative to the orifice 73 and accurately effect a smaller rate of change in the pressure applied at the conduit 69 to simulated pressure changes encountered during the drive of an aircraft at rates within a predetermined low range.

In the selection of relatively high rates of fluid pressure change in the conduit 69, the operation of the bleed valves 402, 404, 408 and 410 is not effected, since the regulating valve 62 is then operating within a range for which it has been designed and which manner of operation has been previously described with reference to FIGURE 3.

In effecting the aforenoted selective energization of the solenoids 415, 417, 519 and 421 under preselected climbing and diving test conditions, the climb or dive selector 130 is operably connected through a shaft 134 to an additional switch member 425 operable in the dive selected position of the member 130 to close a contact 427. Further, upon adjustment of the selector member 130 in counterclockwise direction to the climb position the switch member 425 is so adjusted as to open the contact 427 and selectively close a second contact 429. The contact 427 is connected by an electrical conductor 431 to an adjustable switch arm 433 while the contact 429 is connected through the electrical conductor 435 to a second adjustable switch arm 437. The adjustable switch arms 433 and 437 are operably connected by the shaft 229 to the course rate selector 11 so that upon adjustment of the clutch control arm 225 to selectively close switch contacts 240, 242 and 245 the switch arm 433 is simultaneously adjusted so as to selectively close switch contacts 440, 442 and 445. The adjustable switch arm 437 is also simultaneously adjusted with the arms 225 and 433 so as to selectively close switch contacts 450, 452 and 455.

It will be seen then that with the selector member 130 in the dive position as shown in FIGURE 7 and the operator-operative switch 193 closed, the adjustable switch arm 433 is rendered effective to selectively close the switch contact 440 connected through an electrical conductor 460 for effecting energization of the solenoid 419 to open the relatively large bleed valve 408 simultaneously with the closing by switch arm 225 of the contact 240 for effecting energization of the low speed clutch control solenoid 256. Similarly, upon the switch arm 225 being adjusted to close the contact 242 for effecting energization of the medium speed clutch control solenoid 258, the adjustable switch arm 433 is likewise adjusted to open the contact 440 and close the contact 442 connected through an electrical conductor 462 for effecting energization of the solenoid 421 to open the relatively small bleed valve 410. Upon adjustment of the switch 225 to close the contact 245 so as to effect energization of the high speed clutch control solenoid 260 the adjustable arm 433 is adjusted so as to open the contact 442 and to close the contact 445. In the latter adjusted position of the arm 433, the solenoids controlling the large and small bleed valves 408 and 410 are deenergized permitting the bleed valves to be thereupon adjusted to a normal closed position.

Upon adjustment of the selector member 130 to the climb test position and the operator-operative switch 193 closed, the arm 425 is adjusted through the shaft 134 so as to open the contact 427 thereby opening the circuit to the adjustable arm 433 while the arm 425 is positioned so as to close the contact 429 to apply electrical energy through the conductor 435 to the adjustable arm 437. The adjustable arm 437, like the arm 433, is operably positioned through the shaft 229 simultaneously with the adjustable positioning of the clutch control arm 225 through operation of the course rate selector 11. Thus upon adjustment of the clutch control arm 225 so as to close contact 240 to effectively energize the low speed clutch control solenoid 256, the arm 437 will effectively close contact 450 connected through conductor 470 to effect energization of the solenoid 415 controlling the opening of the large bleed valve 402.

Similarly, upon adjustment of the clutch control arm 225 so as to close contact 242 for effecting energization of the medium speed clutch control solenoid 258 the arm 437 will be adjusted so as to open contact 450 and close the contact 452 connected through a conductor 472 so as to effect energization of the solenoid 417 for opening the small bleed valve 404 during medium rate of climb test conditions. Upon the clutch control arm 225 being adjusted so as to close contact 245 for effecting energization of the high speed clutch control solenoid 260 the adjustable arm 437 will be simultaneously adjusted so as to open contact 452 and close contact 455 thereupon the large bleed valve control solenoid 415 and the small bleed valve control solenoid 417 will be deenergized and the bleed valves controlled thereby biased to closed positions.

It will be seen then that through the aforesaid arrangement of the selectively operable bleed valves, the supplemental action of bleeding fluid pressure medium into and out of the regulator pressure line 69 during predetermined low and medium climbing or diving test conditions will cause the variable pressure regulator needle valve 71 to operate within a moderate opening range and a range close to its optimum operating point for more accurately effecting the regulated pressure to be maintained in the output conduit 69 under the preselected test conditions and thereby extend the operating range of the pressure regulator over the required range of high, medium and low rates for which the system is designed for operation.

Although several embodiments of the invention have been illustrated and described, various changes in the form and relative arrangements of the parts, which will

What is claimed is:

1. A rate of pressure change test apparatus; comprising a test chamber, a fluid pressure regulating valve having first and second fluid pressure conduits for conducting fluid pressure medium to and from said regulating valve, and said first conduit connecting said regulating valve in communication with said test chamber, a first source of fluid pressure medium, a second source of vacuum pressure, operator-operative means, means controlled by said operator-operative means for selectively connecting said first and second sources to said second fluid conduit and thereby through said regulating valve and first fluid conduit to said test chamber, motor means for operatively positioning said regulating valve to change the pressure within said test chamber, control means movable at a selected rate to cause a predetermined pressure change to be maintained in said test chamber, said control means including means controlled by said operator-operative means to select the sense of the pressure change to be maintained in said test chamber, means responsive to the pressure within the test chamber, said pressure responsive means including first and second elements movable relative one to the other, said first element being movable by said pressure responsive means in accordance with changes in the test chamber pressure and said second element being movable by said control means in accordance with the predetermined pressure change to be maintained in said test chamber, means for producing a signal the magnitude of which is in accordance with the difference in position existing between said two elements, and means operatively connecting said signal producing means to said motor means to control said motor means in accordance with said differential signal, said signal producing means including means controlled by said operator-operative means to selectively effect the sense of said differential signal so as to cause a positioning of said regulating valve by said differential signal controlled motor means in a sense such that the pressure within said chamber will be so changed as to cause said first element to be adjustably positioned relative to said second element so as to nullify said differential signal.

2. The combination defined by claim 1 in which said control means includes a second motor means, means operatively connecting said second motor means to said second element including variable speed clutch means, means to vary the speed of said second motor means, and second operator-operative means to simultaneously operate said variable speed clutch means and said speed varying means to effect the predetermined pressure change to be maintained in said test chamber.

3. The combination defined by claim 2 in which said means to vary the speed of said second motor means includes a third operator-operative means to effect a fine rate of selection in the speed of said second motor means, and a fourth operator-operative means to selectively render the third operator-operative means effective.

4. A rate of pressure change test apparatus; comprising a test chamber, a fluid pressure regulating valve having first and second fluid pressure conduit means for conducting fluid pressure medium to and from said regulating valve, said first conduit means being connected to said test chamber, a first source of fluid pressure medium, a second source of vacuum pressure, first means for connecting said second conduit means to said first source, second means for connecting said second conduit means to said second source, alternately operable means to selectively render said first and second connecting means effective, and said first connecting means including a pressure ratio regulator means responsive to the fluid pressure medium in said first and second conduit means and effective to maintain the pressure of the fluid medium supplied to said second conduit means from said first source greater than and at a predetermined ratio relative to the fluid pressure supplied to said first conduit means from said regulating valve, motor means for operatively positioning said regulating valve to change the pressure within said test chamber, control means movable at a selected rate to cause a predetermined pressure change to be maintained in said test chamber, means responsive to the pressure within the test chamber, said pressure responsive means including first and second elements movable relative one to the other, said first element being movable by said pressure responsive means in accordance with changes in the test chamber pressure and said second element being movable by said control means in accordance with the predetermined pressure change to be maintained in said test chamber, means for producing a signal the magnitude of which is in accordance with the difference in position existing between said two elements, and means operatively connecting said signal producing means to said motor means to control said motor means in accordance with said differential signal to cause a positioning of said regulating valve in a sense such that the pressure within said chamber will be so changed as to cause said first element to be adjustably positioned relative to said second element so as to nullify said differential signal.

5. The combination defined by claim 4 including bleed valve means, second operable means to selectively render said bleed valve means effective to connect said first source to said first conduit means upon said second source being connected to said second conduit means and alternately to selectively connect said second source to said first conduit means upon said first source being connected to said second conduit means, and an operator-operative master selector means to operate said first and second mentioned operable means in unison.

6. A rate of pressure change test apparatus; comprising a test chamber, a fluid pressure regulating valve having first and second fluid pressure conduit means for conducting fluid pressure medium to and from said regulating valve, said first conduit means being connected to said test chamber, a source of fluid pressure medium, means for connecting said second conduit means to said source of fluid pressure medium, said connecting means including a pressure ratio regulator means responsive to the pressure of the fluid medium in said first and second conduit means and effective to maintain the pressure of the fluid medium supplied to said regulating valve by said second conduit means greater than and at a predetermined ratio relative to the pressure of the fluid medium supplied to said first conduit means from said regulating valve, and control means for operatively positioning said regulating valve so as to regulate the pressure of the fluid medium in said test chamber.

7. The combination defined by claim 6 in which said control means including means responsive to the pressure within the test chamber, and motor means operatively controlled by said pressure responsive means to adjustably position said regulating valve so as to maintain a predetermined rate of change in the pressure of the fluid medium in said test chamber.

8. A rate of pressure change test apparatus; comprising a test chamber, a fluid pressure regulating valve having first and second fluid pressure conduit means for conducting fluid pressure medium to and from said regulating valve, said first conduit means being connected to said test chamber, a source of fluid pressure medium, means for connecting said second conduit means to said source of fluid pressure medium, said connecting means including a pressure ratio regulator means responsive to the pressure of the fluid medium in said first and second conduit means and effective to maintain the pressure of the fluid medium supplied to said second conduit means greater than and at a predetermined ratio relative to the pressure of the fluid medium supplied to said first conduit means from said regulating valve, first motor means for operatively positioning said regulating valve to vary the pressure of the fluid medium supplied said test chamber through said first fluid conduit means, a velocity servomechanism including a second motor means and a tachometer generator driven thereby at a selected rate, means responsive to the pressure within the test chamber, said pressure responsive means including first and second datum changing members movable relative one to the other, said first datum changing member being movable by said pressure responsive means in accordance with changes in the test chamber pressure, means drivingly connecting said second motor means to said second datum changing member, said first and second datum changing members including means for effecting a signal having a magnitude dependent upon the difference in position existing between said first and second datum changing members, and means operatively connecting said said differential signal means to said first motor means to cause a positioning of said regulating valve in a sense such that the pressure of the fluid medium in said test chamber will be so changed as to cause said pressure responsive means to adjustably position said first datum changing member relative to said second datum changing member in a sense to nullify said differential signal.

9. An apparatus comprising a fluid pressure regulating valve having first and second fluid pressure conduit means for conducting fluid pressure medium to and from said regulating valve, a source of fluid pressure medium, a source of vacuum pressure, means for connecting said first conduit means to said source of fluid pressure medium, said connecting means including a pressure ratio regulator means responsive to the pressure of the fluid medium in said first and second conduit means and effective to maintain the pressure of the fluid medium supplied to said first conduit means greater than and at a predetermined ratio relative to the pressure of the fluid medium supplied to said second conduit means from said regulating valve, bleed valve means selectively operable to connect said second conduit means to said source of vacuum pressure to bleed fluid medium under pressure from said second conduit means during predetermined relatively low rates of increase in the pressure of the fluid medium within said second conduit means, means responsive to changes in the pressure of the fluid medium within said second conduit means, and motor means operatively controlled by said pressure responsive means to adjustably position said regulating valve so as to maintain predetermined rates of change in the pressure of the fluid medium in said second conduit means.

10. An apparatus comprising a fluid pressure regulating valve having first and second fluid pressure conduit means for conducting fluid pressure medium to and from said regulating valve, a source of fluid pressure medium, a source of vacuum pressure, means for connecting said first conduit means to said source of fluid pressure medium, bleed valve means selectively operable to connect said second conduit means to said source of vacuum pressure to bleed fluid medium under pressure from said second conduit means during predetermined relatively low rates of increase in the pressure of the fluid medium within said second conduit means, means responsive to changes in the pressure of the fluid medium within said second conduit means, and motor means operatively controlled by said pressure responsive means to adjustably position said regulating valve so as to maintain predetermined rates of change in the pressure of the fluid medium in said second conduit means.

11. An apparatus comprising a fluid pressure regulating valve having first and second fluid pressure conduit means for conducting fluid pressure medium to and from said regulating valve, a source of fluid pressure medium, a source of vacuum pressure, means for connecting said first conduit means to said source of vacuum pressure, bleed valve means selectively operable to connect said source of fluid pressure medium to said second conduit means to bleed fluid medium under pressure to said second conduit means during predetermined relatively low rates of decrease in the pressure of the fluid medium within said second conduit means, means responsive to changes in the pressure of the fluid medium within said second conduit means, and motor means operatively controlled by said pressure responsive means to adjustably position said regulating valve so as to maintain predetermined rates of change in the pressure of the fluid medium in said second conduit means.

12. A fluid pressure test apparatus comprising a single fluid pressure regulating valve including a valve orifice and a movable valve element cooperating therewith, a first fluid conduit opening to one side of the valve orifice and a second fluid conduit opening to an opposite side of the valve orifice, a source of positive fluid pressure, a source of negative fluid pressure, operator-operative means for selectively connecting said sources of positive and negative fluid pressures to said first conduit, said means for connecting said source of positive fluid pressure to said first conduit including a pressure ratio regulator means differentially responsive to the fluid pressures in said first and second conduits and operatively connected between said source of positive fluid pressure and said first conduit, said pressure ratio regulator means being effective to maintain the fluid pressure supplied to said first conduit from said source of positive fluid pressure at a predetermined ratio relative to the regulated fluid pressure supplied to said second conduit through the fluid pressure regulating valve, and means responsive to the fluid pressure in said second conduit for adjustably positioning said movable valve element relative to said valve orifice so as to regulate the fluid pressure in said second conduit to a predetermined value.

13. A test apparatus for supplying a fluid pressure changing at different selected rates; said apparatus comprising a single fluid pressure regulating valve including a valve orifice and a movable valve element cooperating therewith, a first fluid conduit opening at one side of the valve orifice and a second fluid conduit opening at an opposite side of the valve orifice, a source of a positive fluid pressure, a source of a negative fluid pressure, operator-operative means for selectively connecting said sources of positive and negative fluid pressures to said first conduit, means responsive to the fluid pressure in said second conduit for adjustably positioning said movable valve element relative to said valve orifice so as to supply a regulated fluid pressure in said second conduit, and means for adjusting the pressure responsive means so as to change the value of the regulated fluid pressure at a rate in accordance with a predetermined program.

14. A test apparatus for supplying a fluid pressure changing at different selected rates; said apparatus comprising a single fluid pressure regulating valve including a valve orifice and a movable valve element cooperating therewith, a first fluid conduit opening at one side of the valve orifice and a second fluid conduit opening at an opposite side of the valve orifice, a source of positive fluid pressure, a source of negative fluid pressure, first adjustable operator-operative means for selectively connecting said sources of positive and negative fluid pressures to said first conduit, means responsive to the fluid pressure in said second conduit for adjustably positioning said movable valve element relative to said valve orifice so as to maintain a predetermined regulated fluid pressure in said second conduit, means for adjusting the pressure responsive means so as to change the value of the regulated fluid pressure at a rate in accordance with a predetermined program, second adjustable operator-operative means for selectively setting the rate of change of the regulated pressure at predetermined relatively low and high rates, bleed valve means for selectively connecting said sources of positive and negative fluid pressures to said second conduit, means operatively connecting said first and second operator-operative means to said bleed valve means, whereby upon said second operator-operative means being adjusted so as to selectively set the rate of change of the regulated pressure at said relatively low rate the bleed valve means is rendered effective to bleed the second conduit selectively to one of said sources of fluid pressure other than that to which the first conduit may be selectively connected by the adjustment of the first operator-operative means so as to effectively retard a change in the regulated fluid pressure, and whereby upon said second operator-operative means being adjusted so as to selectively set the rate of change of the regulated pressure at said relatively high rate the bleed valve means is rendered ineffective to bleed the second conduit so as to render the movable valve element as adjustably positioned relative to the valve orifice fully effective to vary the regulated fluid pressure at said selected relatively high rate.

15. The combination defined by claim 14 including a pressure ratio regulator means differentially responsive to the fluid pressures in said first and second conduits and operatively connected between said source of positive fluid pressure and said first conduit, said pressure ratio regulator means being effective to maintain the fluid pressure supplied to said first conduit from said source of positive fluid pressure at a predetermined ratio relative to the regulated fluid pressure supplied to said second conduit through the fluid pressure regulating valve.

References Cited in the file of this patent

UNITED STATES PATENTS 2,893,236    Coon et al. _____ July 7, 1959